United States Patent
Kulkarni et al.

(10) Patent No.: US 6,508,860 B1
(45) Date of Patent: Jan. 21, 2003

(54) GAS SEPARATION MEMBRANE WITH ORGANOSILICON-TREATED MOLECULAR SIEVE

(75) Inventors: Sudhir S. Kulkarni, Wilmington, DE (US); David J. Hasse, Bel Air, MD (US); David R. Corbin, West Chester, PA (US); Aspi N. Patel, Newark, DE (US)

(73) Assignee: L'Air Liquide - Societe Anonyme a'Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/960,194

(22) Filed: Sep. 21, 2001

(51) Int. Cl.[7] .............................. B01D 53/22
(52) U.S. Cl. ................... 95/51; 95/45; 95/54; 96/4; 96/14
(58) Field of Search ............... 95/45, 51, 53, 95/54; 96/4, 10, 14

(56) References Cited

U.S. PATENT DOCUMENTS

| | | | |
|---|---|---|---|
| 3,030,181 A | * | 4/1962 | Milton |
| 4,061,724 A | * | 12/1977 | Grose et al. |
| 4,440,871 A | | 4/1984 | Lok et al. ................... 502/214 |
| 4,503,023 A | * | 3/1985 | Breck et al. |
| 4,544,538 A | | 10/1985 | Zones ...................... 423/326 |
| 4,925,459 A | | 5/1990 | Rojey et al. ................ 155/16 |
| 4,925,562 A | | 5/1990 | te Hennepe et al. .... 210/500.25 |
| 4,973,606 A | | 11/1990 | Sterzel et al. ................. 521/27 |
| 5,104,425 A | * | 4/1992 | Rao et al. ................... 95/51 X |
| 5,127,925 A | | 7/1992 | Kulprathipanja et al. ...... 55/16 |
| 5,772,735 A | * | 6/1998 | Sehgal et al. .................. 95/45 |
| 5,968,366 A | * | 10/1999 | Deckman et al. .......... 95/45 X |
| 6,387,269 B1 | * | 5/2002 | Eltner et al. .............. 95/45 X |

FOREIGN PATENT DOCUMENTS

GB 868846 * 5/1961

* cited by examiner

Primary Examiner—Robert H. Spitzer
(74) Attorney, Agent, or Firm—Jeffrey C. Lew; Linda K. Russell

(57) ABSTRACT

A mixed matrix membrane for gas separations is provided with a nonporous continuous phase of a polymer and a dispersed phase of molecular sieve particles reacted with a monofunctional organosilicon compound. The monofunctional organosilicon compound is characterized by (a) at least one silicon substituent group which reacts or is compatible with the polymer, and (b) at most one displaceable radical that can react with the molecular sieve. A process for making a selectively gas permeable mixed matrix membrane involves reacting a molecular sieve with the monofunctional organosilicon compound, uniformly dispersing the reacted sieve with a polymer, and forming the resulting mixed matrix composition into a membrane structure. These mixed matrix membranes provide an improved combination of permeability and selectivity as compared to polymer-only membranes and mixed matrix membranes in which the molecular sieve is not reacted with a monofunctional organosilicon compound.

23 Claims, No Drawings

GAS SEPARATION MEMBRANE WITH ORGANOSILICON-TREATED MOLECULAR SIEVE

FIELD OF THE INVENTION

This invention relates to mixed matrix membranes for gas separation incorporating a molecular sieve dispersed in a polymeric continuous phase, and more specifically, to such mixed matrix gas separation membranes in which the molecular sieve has been treated with a monofunctional silane compound.

BACKGROUND OF THE INVENTION

The use of selectively gas permeable membranes to separate the components of gas mixtures is a well developed and commercially very important art. Such membranes are traditionally composed of a homogeneous, usually polymeric composition through which the components to be separated from the mixture are able to travel at different rates under a given set of driving force conditions, e.g. transmembrane pressure and concentration gradients.

A relatively recent advance in this field utilizes mixed matrix membranes. Such membranes are characterized by a heterogeneous, active gas separation layer comprising a dispersed phase of discrete particles in a continuous phase of a polymeric material. The dispersed phase particles are microporous materials that have discriminating adsorbent properties for certain size molecules. Chemical compounds of suitable size can selectively migrate through the pores of the dispersed phase particles. In a gas separation involving a mixed matrix membrane, the dispersed phase material is selected to provide separation characteristics which improve the permeability and/or selectivity performance relative to that of an exclusively continuous phase polymeric material membrane.

Previous research on mixed matrix membranes with enhanced selectivity has suggested the use of zeolites for the dispersed phase particles. Some types of zeolites identified for use in mixed matrix membranes include: MFI type, such as silicalite, LTA types 4A and 5A, and FAU types X and Y with various substituted cations. Further understanding of conventional use of zeolites in mixed matrix membranes may be understood with reference to the following patents:

U.S. Pat. No. 5,127,925 (Kulprathipanja et al.) describes a process for separating a first gas component from a feed gas mixture calling for contacting the mixture with a mixed matrix membrane of an organic polymer having an adsorbent incorporated therein. The adsorbent material is selected from among zeolites such as crystalline aluminosilicates, silicalite, inorganic oxides, activated carbon or ion exchange resin.

U.S. Pat. No. 4,925,562 (te Hennepe et al.) discloses a pervaporation process which employs a membrane comprising an elastomeric polymer matrix containing zeolite. In a preferred embodiment, the elastomeric polymer matrix is silicone rubber comprising a polysiloxane. Preferred zeolites include hydrophobic aluminosilicates with a high Si/Al ratio. Silicalite is disclosed as a suitable zeolite.

Although this technology has steadily advanced, it is a persistent general shortcoming of gas separation membranes that usually either high transmembrane flux or high selectivity can be obtained at sacrifice of the other. The advent of mixed matrix membranes provided the ability to better design a membrane to achieve optimum performance by using two permeable materials with different permeability and selectivity characteristics. However, the heterogeneous nature of mixed matrix membranes also introduces certain problems which have prevented this technology from fully surmounting the aforementioned shortcoming. In particular, unless there is affinity between the dispersed phase and continuous phase materials, voids can occur at the interface during membrane fabrication and use. The migrating components can travel through the voids and thereby avoid passing through the selectively permeable materials. This contributes to poor separation performance.

U.S. Pat. No. 4,925,459 (Rojey et al.) discloses a gas separation membrane comprising an active layer including particles of a selective solid dispersed in a continuous non-porous and non-elastomeric polymer phase and a porous support. The patent teaches that zeolites are particularly adapted for use in the dispersed phase. It also states that the dispersed phase can be pretreated with a binding agent such as a silane before mixing it with polymer solution. A theory has now been formulated that certain adhesive agents, including some silanes, can actually interfere with transport of the selectively permeating species through the discrete phase particles. For example, it is suggested that the adhesive can block entry into the pores or surround the particles with a permeability inhibiting barrier layer. These or other mechanisms may be responsible for reducing mixed matrix membrane separation performance. Thus it remains highly desirable to provide a mixed matrix gas separation membrane having molecular sieve dispersed in a continuous polymer matrix which can produce the combination of higher permeability and selectivity than has heretofore been attainable.

SUMMARY OF THE INVENTION

The present invention now provides a mixed matrix gas separation membrane comprising particles of a treated molecular sieve dispersed in a continuous phase consisting essentially of a matrix polymer, in which the treated molecular sieve comprises the reaction product of a molecular sieve and a monofunctional organosilicon compound having the formula $Si(XYR_1R_2)$ in which X is a displaceable radical, Y is a linking group, and $R_1$ and $R_2$ are each independently any radical other than a displaceable radical.

There is also provided a process for making a mixed matrix gas separation membrane having an active layer of particles of a treated molecular sieve dispersed in a continuous phase consisting essentially of a matrix polymer, comprising the steps of, (A) providing a monofunctional organosilicon compound having the formula $Si(XYR_1R_2)$ in which X is a displaceable radical, Y is a linking group, and $R_1$ and $R_2$ are each independently any radical other than a displaceable radical, (B) reacting a molecular sieve with the monofunctional organosilicon compound at a temperature and for a duration effective to bond the molecular sieve to the Si atom of the monofunctional organosilicon compound by displacing the radical X, thereby forming the treated molecular sieve, (C) blending the product of the preceding step with an amount of the matrix polymer effective to obtain a blend having a proportion of about 5–50 weight parts molecular sieve per 100 weight parts polymer, and (D) forming a membrane structure from the blend.

In another aspect, this invention provides a process for making a mixed matrix gas separation membrane as described immediately above in which after the reacting (B) step further comprises the step of sizing the treated molecular sieve with the polymer comprising reacting a linking group of the treated molecular sieve to the matrix polymer.

There is yet further provided a process for separating component gases of a gas mixture comprising the steps of (A) providing a mixed matrix gas separation membrane comprising an active layer of a treated molecular sieve dispersed in a continuous phase of a matrix polymer in which the treated molecular sieve comprises the reaction product of a (i) molecular sieve through which at least one component gas in the mixture is preferentially gas permeable relative to another component gas, with (ii) a monofunctional organosilicon compound having the formula $Si(XYR_1R_2)$ in which X is a displaceable radical, Y is a linking group, and $R_1$ and $R_2$ are each independently any radical other than a displaceable radical, (B) contacting the gas mixture on one side of the membrane to cause the component gases to selectively permeate the membrane, and (C) removing from the opposite side of the membrane a permeate gas composition enriched in concentration of the at least one component gas.

DETAILED DESCRIPTION

This invention pertains to mixed matrix membranes. By "mixed matrix" is meant that the membrane has a selectively gas permeable layer which comprises a continuous phase of a polymeric material and discrete particles of adsorbent material uniformly dispersed throughout the continuous phase. These particles are collectively sometimes referred to herein as the "discrete phase" or the "dispersed phase". Thus the term "mixed matrix" is used here to designate the composite of discrete phase particles dispersed within the continuous phase.

The adsorbent material utilized in the present invention is a type of molecular sieve. Molecular sieves, exist in both natural and synthetic forms. They are well known in the art to encompass an extensive variety of species and are described in *Atlas of Zeolite Structure Types* W. M. Meier, DH Olson and Ch. Baerlocher, Zeolites 1996, 17 (A1–A6), 1–230 (hereinafter "IZA"), in *Molecular Sieves: Principles of Synthesis and Identification*, R. Szostak, Van Nostrand Reinhold, (1989), and in *Zeolite Molecular Sieves*, D. Breck, John Wiley and Sons, 1973, (Breck), the complete disclosures of which are hereby incorporated herein by reference. Molecular sieves have framework structures which may be characterized by distinctive wide-angle X-ray diffraction patterns. Zeolites are a subclass of molecular sieves based on an aluminosilicate composition. Non-zeolitic molecular sieves are based on other compositions such as aluminophosphates, silico-aluminophosphates, and silica. Molecular sieves of different chemical compositions can have the same framework structure.

Zeolites can be further broadly described as molecular sieves in which complex aluminosilicate molecules assemble to define a three-dimensional framework structure enclosing cavities occupied by ions and water molecules which can move with significant freedom within the zeolite matrix. In commercially useful zeolites, the water molecules can be removed from or replaced without destroying the framework structure. Zeolite composition can be represented by the following formula: $M_{2/n}O \cdot Al_2O_3 \cdot xSiO_2 \cdot yH_2O$, wherein M is a cation of valence n, x is greater than or equal to 2, and y is a number determined by the porosity and the hydration state of the zeolites, generally from 0 to 8. In naturally occurring zeolites, M is principally represented by Na, Ca, K, Mg and Ba in proportions usually reflecting their approximate geochemical abundance. The cations M are loosely bound to the structure and can frequently be completely or partially replaced with other cations or hydrogen by conventional ion exchange. Acid forms of molecular sieve sorbents can be prepared by a variety of techniques including ammonium exchange followed by calcination or by direct exchange of alkali ions for protons using mineral acids or ion exchangers. For a discussion of acid sites in zeolites see J. Dwyer, "Zeolite, Structure, Composition and Catalysis" in Chemistry and Industry, Apr. 2, 1984.

The zeolite framework structure has corner-linked tetrahedra with Al or Si atoms at centers of the tetrahedra and oxygen atoms at corners. Such tetrahedra are combined in a well-defined repeating structure comprising various combinations of 4-, 6-, 8-, 10-, and 12-membered rings. The resulting framework structure is one of regular channels and cages, which has a pore network that is useful for separation. Pore dimensions are determined by the geometry of the aluminosilicate tetrahedra forming the zeolite channels or cages, with nominal openings of 0.26 nm for 6-member rings, 0.40 nm for 8-member rings, 0.55 nm for 10-member rings and 0.74 nm for 12-member rings (these numbers assume ionic radii for oxygen). Those skilled in the art will recognize that zeolites with the largest pores being 8-member rings, 10-member rings, and 12-member rings are considered small, medium, and large pore zeolites, respectively. Pore dimensions are critical to the performance of these materials in catalytic and separation applications, since this characteristic determines whether molecules of certain size can enter and exit the zeolite framework. In practice, it has been observed that very slight decreases in ring dimensions can effectively hinder or block movement of particular molecular species through the zeolite structure.

The effective pore dimensions that control access to the interior of the zeolites are determined not only by the geometric dimensions of the tetrahedra forming the pore opening, but also by the presence or absence of ions in or near the pore. For example, in the case of zeolite type A, access can be restricted by monovalent ions, such as $Na^+$ or $K^+$, which are situated in or near 8-member ring openings as well as 6-member ring openings. Access can be enhanced by divalent ions, such as $Ca^{2+}$, which are situated only in or near 6-member ring openings. Thus, the potassium and sodium salts of zeolite A exhibit effective pore openings of about 0.3 nm and 0.4 nm respectively, whereas the calcium salt of zeolite A has an effective pore opening of 0.5 nm. The presence or absence of ions in or near the pores, channels, and/or cages can also significantly modify the accessible pore volume of the zeolite for sorbing materials.

Thus the KA zeolite (also known as 3A) allows a constituent whose molecule has a size less than 3 Å (0.3 nm, 1 Å=1×10$^{-10}$ m) to be separated from a constituent whose molecule has a size greater than 3 Å (0.3 nm). For example, KA zeolite therefore allows separation of water which can enter the pores of the zeolite from methane which is excluded. Similarly, NaA zeolite (also known as 4A) allows a constituent whose molecule has a size less than 4 Å (0.4 nm) to be separated from a constituent whose molecule has a size greater than 4 Å, (0.4 nm) and CaA zeolite, (also known as 5A) allows normal paraffins to be separated from a mixture of normal paraffins and isoparaffins.

Representative examples of zeolites are small pore zeolites such as NaA, CaA, Erionite, Rho, ZK-5 and chabazite; medium pore zeolites such as ZSM-5, ZSM-11, ZSM-22, and ZSM-48, and large pore zeolites such as zeolite beta, zeolite L, NaX, NaY, and CaY.

The silicon/aluminum atomic ratio of a given zeolite can vary over a wide range. For example, zeolite X can be synthesized with silicon/aluminum atomic ratios of from 1 to 1.5; and zeolite Y, from 1.5 to about 3. In some molecular sieves, such as MFI type, the upper limit of the silicon/aluminum atomic ratio is unbounded. ZSM-5 is one such example wherein the silicon/aluminum atomic ratio is at least 12. Low alumina-containing zeolites also can be prepared synthetically or by modification of high alumina-containing zeolites using methods well known in the art. These methods include but are not limited by treatment using $SiCl_4$ or $(NH_4)_2SiF_6$ as well as steaming followed by acid treatment. The $SiCl_4$ treatment is described in J. Chem. Ed. 67(6), 519–521, 1990. The $(NH_4)_2SiF_6$ treatment by Breck et al., is described in U.S. Pat. No. 4,503,023. These treatments are generally very effective at increasing the Si/Al ratio for zeolites such as zeolites Y and mordenite.

Another class of molecular sieves is characterized by $AlO_2$ and $PO_2$ units ($AlPO_4$ or aluminum phosphates) of which at least some Al or P constituents optionally may be substituted by other elements such as Si (called silicoaluminophosphates or SAPO's), or metals (called metalloaluminophosphates or MeAPO's) or combinations thereof (called metalloalumino-phosphosilicates or MeAPSO's). These $AlPO_4$, SAPO, MeAPO, and MeAPSO materials are crystalline and have ordered pore structures which accept certain molecules while rejecting others.

A type of molecular sieve used in the mixed matrix membrane of this invention is iso-structural with the mineral zeolite known as chabazite. That is, they are characterized by the chabazite framework structure designated as CHA by the IZA reference. This molecular sieve type derives its name from the structure of a naturally occurring mineral with the approximate unit cell formula $Ca_6Al_{12}Si_{24}O_{72}$. The chabazite type (CHA) molecular sieves are distinguished by channels based on 8-member rings with about 3.8 Å×3.8 Å (0.38 nm×0.38 nm) dimensions.

Identification of chabazite is generally made by X-ray powder diffraction. A number of synthetic molecular sieves generate the characteristic diffraction pattern of CHA type and therefore are reported (for example, in the IZA reference and Szostak cited above) to have the same CHA framework structure as (or are iso-structural with) the mineral chabazite.

The integrated intensities of the observed X-ray peaks can be used as a measure of molecular sieve crystallinity. High intensities indicate a highly crystalline material. However, as crystallite size falls below about 50 nm, X-ray diffraction peaks broaden (H. P. Klug and L. E. Alexander, X-Ray Diffraction Techniques, Wiley-Interscience, N. Y., 1974). When crystallite size falls below about 2–6 nm, peaks become so broad that they are difficult to detect by conventional analog recording spectrometers. Despite a lack of measurable X-ray peak intensity, such "X-ray amorphous" zeolite crystallites are capable of shape selective catalysis, as recently reported by Jacobs et al., J. Chemical Society, Chemical Communications, p. 591 (1981). For such crystallites, molecular sieve crystallinity is evident from infra-red spectra, sorption measurements, and catalytic shape selectivity. The CHA molecular sieve materials of the present invention can be highly crystalline, poorly crystalline, or X-ray amorphous crystallites. Thus the term "chabazite" herein is intended to encompass any molecular sieves which exhibit the characteristic X-ray diffraction pattern of the CHA structure or can be identified as CHA type by infra-red spectra, sorption measurements and/or catalytic shape selectivity.

Various synthetic forms of CHA type molecular sieves are known. Several CHA type zeolites described by Breck are Zeolite "K-G", a potassium form having a silica: alumina mole ratio of 2.3:1 to 4.15:1, reportedly described in J. Chem Soc., p. 2822 (1956), Barrer et al; Zeolite D, a sodium-potassium form having a silica:alumina mole ratio of 4.5:1 to 4.9:1, reportedly described in British Patent No. 868,846 (1961); and Zeolite R, a sodium form which has a silica:alumina mole ratio of 3.45:1 to 3.65:1, reportedly described in U.S. Pat. No. 3,030,181 (1962). A pure SiO2 chabazite type molecular sieve is described by Cabanas et al. *Synthesis and structure of pure SiO2 chabazite,* Chem. Commun. 1998, 1881–2. Willhendersonite is identified as a CHA type molecular sieve by Lengauer et al., *Dehydration and structural transformation in the chabazite-type zeolite Willhendersonite,* Eur. J. Miner. 1999 Bh. 1, 144. The disclosures of these sources is hereby incorporated herein by reference.

Additional illustrative examples of CHA type molecular sieves suitable for use in this invention include SSZ-13, H-SSZ-13, Na-SSZ-13, SAPO-34, and SAPO-44. SSZ-13 is an aluminosilicate molecular sieve material prepared as disclosed in U.S. Pat. No. 4,544,538, the entire disclosure of which is hereby incorporated by reference. Generally, SSZ-13 is a zeolite having a mole ratio of an oxide selected from silicon oxide, germanium oxide, and mixtures thereof to an oxide selected from aluminum oxide, gallium oxide, and mixtures thereof greater than about 5:1 and having the X-ray diffraction lines of Table 1 of U.S. Pat. No. 4,544,538. The zeolite further has a composition, as synthesized and in the anhydrous state, in terms of mole ratios of oxides as follows: (0.5 to 1.4) $R_2O$: (0 to 0.50) $M_2O:W_2O_3$: (greater than 5) $YO_2$ wherein M is an alkali metal cation, W is selected from aluminum, gallium, and mixtures thereof, Y is selected from silicon, germanium and mixtures thereof, and R is an organic cation. The organic R is removed typically by calcination at about 280–500° C. SSZ-13 zeolites can have a $YO_2:W_2O_3$ mole ratio greater than about 5:1. As prepared, the silica:alumina mole ratio is typically in the range of 8:1 to about 50:1. Higher mole ratios can be obtained by varying the relative ratios of reactants. Higher mole ratios can also be obtained by treating the zeolite with chelating agents or acids to extract aluminum from the zeolite lattice. The silica:alumina mole ratio can also be increased by using silicon and carbon halides and similar compounds. Preferably, SSZ-13 is an aluminosilicate in which W is aluminum and Y is silicon.

It is sometimes desirable to remove the alkali metal cation from SSZ-13 and to replace it with hydrogen, ammonium or other desired metal ion. Ion exchange can occur after the organic moiety R is removed, usually by calcination. The hydrogen and sodium forms of SSZ-13, referred to herein respectively as H-SSZ-13 and Na-SSZ-13, are particularly preferred CHA molecular sieves for use in this invention. H-SSZ-13 is formed from SSZ-13 by hydrogen exchange or preferably by ammonium exchange followed by heating to about 280–400° C. A sample of H-SSZ-13 was found to have an Si/Al ratio of about 20–24 and Na/Al ratio of less than about 0.3 by electron spectroscopy chemical application ("ESCA") analysis or by inductively coupled plasma ("ICP") analysis.

Description and method of preparation of the silicoaluminophosphate molecular sieves SAPO-34 and SAPO-44 are found in U.S. Pat. No. 4,440,871, which is hereby incorporated herein by reference. The structure of these zeolites is reported by Ashtekar et al., (Journal of Physical Chemistry, V98, N18, May 5, 1994, p. 4878) to be that of the CHA type. SAPO-34 is also identified as having a CHA type structure in the Journal of American Chemical Society, 106, p. 6092–93 (1984).

Another type of molecular sieve suitable for use with this invention is silicalite. Silicalite is a hydrophobic, crystalline silica-based molecular sieve. Silicalite I can be prepared according to the procedure described in U.S. Pat. No. 4,061,724, the disclosure of which is hereby incorporated herein by reference. Silicalite I is classified by the IZA reference as having an MFI framework structure based on ten-member rings with about 5.1 Å×5.6 Å (0.51 nm×0.51 nm) pore dimensions.

The continuous phase of the mixed matrix membrane consists essentially of polymer. To distinguish from other polymers related to this invention, the term "matrix" polymer is sometimes used herein to refer to the polymer of the continuous phase. By "consists essentially of" is meant that the continuous phase, in addition to polymeric material, may include non-polymer materials that do not materially affect the basic and novel properties of this invention. For example, the continuous phase can include preferably small proportions of fillers, additives and process aids, such as surfactant residue used to promote dispersion of the molecular sieve in the polymer during fabrication of the membrane.

Preferably the polymeric continuous phase is nonporous. By "nonporous" is meant that the continuous phase is substantially free of dispersed cavities or pores through which components of the gas mixture could migrate. Transmembrane flux of the migrating components through the polymeric continuous phase is thus driven primarily by molecular solution/diffusion mechanisms. Therefore it is important that this polymer chosen for the continuous phase is permeable to the components to be separated from the gas mixture. Preferably the polymer is selectively gas permeable to the components, meaning that gases to be separated from each other permeate the membrane at different rates. That is, a highly permeable gas will travel through the continuous phase faster than will a less permeable gas. The selectivity of a gas permeable polymer is the ratio of the permeabilities of the pure component gases. Hence, the greater the difference between transmembrane fluxes of individual components, the larger will be the selectivity of a particular polymer.

Each molecular sieve to be used in the dispersed phase has particular separation characteristics of permeability and selectivity with respect to the components of a given gas mixture. These characteristics are largely determined by such factors as the effective pore size and framework structure. The molecular sieve separation characteristics can be chosen to be different from those of the continuous phase polymer. Usually, the separation characteristics of the molecular sieve are selected so that overall separation performance through the mixed matrix membrane is enhanced relative to performance through a homogenous membrane of the continuous phase material. For example, a selectively gas permeable polymer might have a high permeability but low selectivity in relation to a specific mixture of gases. A molecular sieve having high selectivity for the same gases can be dispersed in the continuous phase of such polymer to produce a mixed matrix membrane having a superior combination of selectivity and permeability.

A diverse variety of polymers can be used for the continuous phase. Typical polymers suitable for the nonporous polymer of the continuous phase according to the invention include substituted or unsubstituted polymers and may be selected from polysiloxane, polycarbonates, silicone-containing polycarbonates, brominated polycarbonates, polysulfones, polyether sulfones, sulfonated polysulfones, sulfonated polyether sulfones, polyimides and aryl polyimides, polyether imides, polyketones, polyether ketones, polyamides including aryl polyamides, poly (esteramide-diisocyanate), polyamide/imides, polyolefins such as polyethylene, polypropylene, polybutylene, poly-4-methyl pentene, polyacetylenes, polytrimethysilylpropyne, fluorinated polymers such as those formed from tetrafluoroethylene and perfluorodioxoles, poly(styrenes), including styrene-containing copolymers such as acrylonitrile-styrene copolymers, styrene-butadiene copolymers and styrene-vinylbenzylhalide copolymers, cellulosic polymers, such as cellulose acetate-butyrate, cellulose propionate, ethyl cellulose, methyl cellulose, cellulose triacetate, and nitrocellulose, polyethers, poly(arylene oxides) such as poly (phenylene oxide) and poly(xylene oxide), polyurethanes, polyesters (including polyarylates), such as poly(ethylene terephthalate), and poly(phenylene terephthalate), poly (alkyl methacrylates), poly(acrylates), polysulfides, polyvinyls, e.g., poly(vinyl chloride), poly(vinyl fluoride), poly(vinylidene chloride), poly(vinylidene fluoride), poly (vinyl alcohol), poly(vinyl esters) such as poly(vinyl acetate) and poly(vinyl propionate), poly(vinyl pyridines), poly(vinyl pyrrolidones), poly(vinyl ketones), poly(vinyl ethers), poly(vinyl aldehydes) such as poly(vinyl formal) and poly(vinyl butyral), poly(vinyl amides), poly(vinyl amines), poly(vinyl urethanes), poly(vinyl ureas), poly (vinyl phosphates), and poly(vinyl sulfates), polyallyls, poly (benzobenzimidazole), polyhydrazides, polyoxadiazoles, polytriazoles: poly(benzimidazole), polycarbodiimides, polyphosphazines, and interpolymers, including block interpolymers containing repeating units from the above such as terpolymers of acrylonitrile-vinyl bromide-sodium salt of para-sulfophenylmethallyl ethers, and grafts and blends containing any of the foregoing. The polymer suitable for use in the continuous phase is intended to also encompass copolymers of two or more monomers utilized to obtain any of the homopolymers or copolymers named above. Typical substituents providing substituted polymers include halogens such as fluorine, chlorine and bromine, hydroxyl groups, lower alkyl groups, lower alkoxy groups, monocyclic aryl, lower acyl groups and the like.

Preferred polymers for the continuous phase are polysiloxane, polycarbonates, silicone-containing polycarbonates, brominated polycarbonates, polysulfones, polyether sulfones, sulfonated polysulfones, sulfonated polyether sulfones, polyimides, polyether imides, polyketones, polyether ketones, polyamides, polyamide/ imides, polyolefins such as poly-4-methyl pentene, polyacetylenes such as polytrimethysilylpropyne, and fluoropolymers including fluorinated polymers and copolymers of fluorinated monomers such as fluorinated olefins and fluorodioxoles, and cellulosic polymers, such as cellulose diacetate and cellulose triacetate.

Any of the above mentioned types of molecular sieve are amenable to surface treatment with monofunctional organo-silicon compound according to this invention provided that the molecular sieve has on its surface a sufficient number of silanol or acid groups available to react with the compound to provide effective compatibility between the dispersed phase particles and the continuous phase polymer. One can test a molecular sieve candidate for suitability by directly determining the surface silanol concentration of the candidate material and of silicalite. Well known direct measurement techniques include spectroscopic methods such as Fourier-transform infrared spectroscopy ("FTIR") and nuclear magnetic resonance spectroscopy ("NMR"). See Smith, L. J, et al., *A newtonian diffraction and infrared spectroscopy study of the acid form of the aluminosilicate zeolite, chabazite (H-SSZ-*13) Catalyst Letters (49) 143–146, 1997, and Kunkeler, P. J., et al., *Zeolite Beta: The relationship between calcination procedure, aluminum configuration and Lewis acidity,* Journal of Catalysis, (180), 234–244 (1998). If the surface silanol concentration of the candidate is about equal to or higher than that of silicalite, it is likely that the molecular sieve candidate can be adequately treated to be compatibilized with the continuous phase polymer according to this invention. Another test for suitability of a molecular sieve candidate calls for treating the candidate material with a monofunctional organosilicon compound as will be described in greater detail, below. The treated candidate is then washed to remove unreacted organosilicon compound and the concentration of residual compound bound to the sieve can be determined by measuring the organic portion in the reaction product; by such well known methods as infrared, NMR and ESCA For example, for an amino-organosilicon compound, the concentration of organosilicon compound reacted with the molecular sieve can be estimated by measuring the amino group response by FTIR, proton-NMR or ESCA analyses. This amino group concentration response can then be compared with the corresponding response obtained when silicalite is treated with the same amino-organosilicon compound. The treatment should be sufficient if the amino group response is at least about equal to the response obtained with silicalite. One of ordinary skill in the art can thus determine whether the silanol content of a molecular sieve is suitable without undue experimentation.

The molecular sieve particle size should be small enough to provide a uniform dispersion of the particles in the suspension from which the mixed matrix membrane will be formed and also to obtain uniform distribution of the dispersed phase particles in the continuous phase of the mixed matrix membrane. The median particle size should be less than about 10 $\mu$m, preferably less than 3 $\mu$m, and more preferably less than 1 $\mu$m. Large agglomerates should be reduced to less than about 10 $\mu$m and preferably less than about 3 $\mu$m. Very fine molecular sieve particles may be made by various techniques such as by choosing appropriate synthesis conditions or by physical size reduction methods well known to those of ordinary skill in the art, such as ball milling, wet-milliing and ultrasonication. In some cases, the size reduction process, e.g., ultrasonication or wet-milling can be advantageously carried out at the same time as reaction of the molecular sieve with a monofunctional organosilicon compound in accordance with this invention.

According to this invention the dispersed phase molecular sieve is made compatible with the continuous phase polymer so that few, if any, voids form between the sieve and the polymer. Improved compatibility between the dispersed phase molecular sieve and the continuous phase polymer also reduces the tendency of the dispersed phase to agglomerate in the final membrane. As briefly mentioned, voids provide a path for migrating species to bypass the selectively permeable materials and therefore can have a negative influence on permeability and/or selectivity of a mixed matrix membrane. Thus this invention provides the advantage of enabling production of a reduced-void or void-free mixed matrix membrane with excellent dispersion of dispersed phase particles.

Compatibility between sieve and polymer is achieved basically by treating the sieves with a monofunctional organosilicon compound in which this compound becomes bonded to the surface of the molecular sieve. This bonding occurs at only one of the four bond sites of the silicon atom in the compound. The monofunctional organosilicon compound also has one or more substituent moieties, occasionally referred to herein as "linking groups". These are groups which have affinity for or which chemically react with the polymeric continuous phase. Hence, attraction between molecular sieve treated with monofunctional organosilicon compound and the continuous phase is enhanced. This reduces the formation of voids at the dispersed phase-continuous phase interface.

The term "monofunctional" emphasizes that the organosilicon molecule has a single tetravalent silicon atom to which only one silanol group of the molecular sieve can bond. The single functional group is sometimes referred to herein as a "displaceable radical". The monofunctional organosilicon compound can have other substituent groups which are functional in different ways. For example, the linking groups can bond or associate with the polymer. This monofunctional aspect of the organosilicon compound is designed to cause the organosilicon compound to attach to the surface of the molecular sieve in a mono-molecular thickness layer and preferably without substantial crosslinking between neighboring attached organosilicon compound molecules. Without wishing to be bound by a particular theory, it is contemplated that the monofunctional organosilicon compound attaches to the sieve largely without blocking the pores.

Polyfunctional organosilicon compounds can also provide desired interfacial adhesion. In contrast to the monofunctional compounds, however, polyfunctional compounds can block the molecular sieve pores, build up a network over the molecular sieve surface to an excessive thickness or otherwise interfere with the transport of the migrating molecules through the membrane. Only with rigorous control of reaction conditions, e.g., by scrupulously maintaining an anhydrous system, can polyfunctional organosilicon compounds form a mono-molecular layer of comparable morphology to that obtained readily by a monofunctional organosilicon compound.

Mixed matrix membranes having improved gas separation performance can be produced by using molecular sieve treated with the monofunctional organosilicon compound which permits the treated sieve particles to bond or associate with the continuous phase polymer. Broadly stated, the procedure for using the compound to join the sieve particles to the polymer includes two major steps. One involves reacting the monofunctional organosilicon compound at the site of the displaceable radical with free silanol on the molecular sieve surface. This step, often called "silanation" of the sieve, typically results in substitution of the displaceable radical of the compound by the silanol of the molecular sieve. A molecular sieve having been treated in this fashion may be said to be "silanated". The monofunctional organosilicon compound thus becomes chemically bonded via the single silicon atom bond site formerly occupied by the displaceable radical prior to silanation.

The other major step relates to uniting the organosilicon compound affixed to the surface of the molecular sieve particles with the continuous phase polymer. Two mechanisms for obtaining affinity between the silanated sieve and the polymer are contemplated. Firstly, the linking groups can react with the polymer to form direct chemical bonds therebetween. Alternatively, the linking groups can associate with the polymer because the chemical compositions of the linking groups and the polymer are selected to be mutually attractive. For example, the linking groups and polymer can be populated with moieties which have mutually attractive polar or dipolar interactions. Affinity can also be attained by reacting or associating the linking groups with a monomer of the continuous phase polymer. That is, the linking groups are caused to react or associate with free monomer so that the sieve-monomer adduct has enhanced affinity for the polymer by virtue of the chemical compatibility of the monomer and the polymer. The step of joining the silanated molecular sieve to the polymer by either reacting or associating the linking groups with the polymer or monomer of the polymer is sometimes referred to herein as "sizing".

The term "associate" is used here to mean that the attraction between the linking groups and polymer is strong but short of a bond resulting from chemical reaction. A way to determine whether a linking group is suitable for associating with the polymer calls for silanating a molecular sieve with an monofunctional organosilicon compound having the candidate linking group substituted thereon. The treated sieve is then intimately mixed with the continuous phase polymer, usually by blending a dispersion of the sieve particles in a solvent with a solution of the polymer. After removing the solvent, the mixed matrix material is cross-sectioned by cryo-fracturing and then gold coated. The section is examined by scanning electron microscopy ("SEM") at 10,000–20,000 power magnification. If no gaps are seen between the continuous phase polymer and the embedded particles, then the linking group is deemed to acceptably associate with the polymer for purposes of this invention.

In a preferred embodiment, the monofunctional organosilicon compound has chemical composition of the formula $Si(XYR_1R_2)$ which also may be represented diagramatically by the following structure:

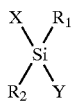

in which

X is a displaceable radical,

Y is a linking group, and $R_1$ and $R_2$ are each independently any radical other than a displaceable radical.

"Displaceable radical" means an active functional group capable of reacting with silanol groups on the molecular sieve such that X is displaced leaving the molecular sieve bonded to the monofunctional organosilicon compound at the X—Si bond position. Preferably, the displaceable radical can be a halogen, a hydroxyl group, or an ester or alkoxy radical having from 1–8 carbon atoms. Any halogen, i.e., fluorine, chlorine, iodine, or bromine atom can be used. A representative ester is the acetoxy radical. Illustrative examples of alkoxy radicals of substitutent X include methoxy, ethoxy, n-propoxy and t-butoxy radicals.

The chemical composition of Y will largely depend upon the composition of the continuous phase polymer. The linking group is selected for capability of reacting or associating with the polymer or a monomer of the polymer. Knowing the latter, one of ordinary skill in the art can identify functional groups that can react with the polymer or with a monomer of the polymer. Similarly, the likelihood that a functional group is able to associate with a particular polymer or monomer composition can be estimated by one of ordinary skill in the chemical arts. The usefulness of a particular candidate linking group to react or associate with the polymer can be verified by the method described above. Typical examples of Y which can be used with polymer of suitable co-reactivity include amino radicals, such as aminopropyl and aminophenyl, amido radicals, such as methacrylamido and ethacrylamido, ureido radicals, such as ureidopropylepoxy, epoxy radicals, such as epoxycyclohexyl and glycidoxypropyl, and isocyanoato radicals, such as cyanoethyl and cyanopropyl. $R_1$ and $R_2$ can be non-reactive hydrocarbon radicals including straight chain and branched alkyls, such as methyl, ethyl, n-propyl, isopropyl, n-butyl and t-butyl radicals. Optionally, $R_1$, $R_2$ or both can be a linking group. Illustrative of suitable monofunctional organosilicon compounds include the silanes 3-aminopropyldimethylethoxysilane (APDMS), 3-isocyanatopropyldimethylchlorosilane (ICDMS), 3-aminopropyldiisopropylethoxysilane (APDIPS) and mixtures thereof The silanation step for treating the molecular sieve according to this invention typically involves a chemical reaction to condense the monofunctional organosilicon compound onto the molecular sieve at silanol groups on the molecular sieve surface. Usually this is carried out in a suspension of the molecular sieves in a liquid medium of a solvent containing the dissolved compound.

The solvent utilized for the silanation medium is chosen primarily for its ability to dissolve the monofunctional organosilicon compound. It is also desirable that the compound and solvent can form a solution of viscosity which is satisfactory to permit easy mechanical or ultrasonic dispersion of the compound in the medium at desired solution concentrations and temperatures. Preferably temperature of the silanation reaction is about 15–80° C., and more preferably about 25–50° C. The concentration of the compound in solution is preferably about 0.1 to about 5 wt. % and more preferably about 1–2 wt. %. Representative solvents which can be used for dissolving monofunctional organosilicon compound having either alkoxy, hydroxyl or ester displaceable radicals according to this invention include ethanol, methanol, isopropanol, water and mixtures thereof. A preferred solvent is 95:5 ethanol:water solution. For halogen displaceable radicals, anhydrous solvents should be utilized. Tetrahydrofuran or toluene are representative. Anhydrous solvents should be used when the monofunctional organosilicon compound contains hydrolytically unstable linking groups, such as cyano radicals.

The liquid medium ingredients can be agitated to form a completely miscible mixture. The organosilicon compound is added in an amount in excess of the stoichiometric amount required to fully react with silanol groups on the molecular sieve to be treated. When the homogeneous liquid medium has been formed, the molecular sieve is added while maintaining the medium in a state of agitation effective to disperse the molecular sieve particles uniformly throughout the liquid. Heat can be applied prior to, during or after addition of the molecular sieve to attain reaction temperature. These conditions are maintained for a duration effective to substantially completely condense the monofunctional organosilicon compound onto the molecular sieve. For monofunctional organosilicon compounds with alkoxy, hydroxyl or ester displaceable radicals, preferably the silanation reaction conditions are continued for about 1 to about 60 minutes. Silanation with compounds having halogen displaceable radicals may call for longer reaction time, i.e.., up to about 24 hours, and preferably at a temperature near the boiling point of the solvent. After reaction is completed, the temperature of the reaction mass can be lowered to ambient and the treated molecular sieve particles are then filtered free of excess reactants and washed, preferably repeatedly, in clean solvent to remove trace residual reactants.

When an organosilicon compound substituted with reactive linking groups is used, the linking groups coupled to the molecular sieve during the silanation step can be further reacted with monomer or polymer in the subsequent sizing step. Sizing step temperature is preferably in the range of about 35–200° C., and more preferably about 120–160° C. The reaction duration is usually about 30 to about 300 minutes. The particles can then be filtered free of excess reactants, washed, dried and stored for later use. This provides molecular sieve particles with monomer or polymer bound to the sieve surface by the organosilicon compound linkage.

In a preferred method of sizing the treated molecular sieves, filtered and cleaned particles of treated molecular sieve from the silanation step are suspended in fresh, dilute solution of about 0.2–5%, preferably about 0.5–1% continuous phase polymer. Representative solvents suitable for this polymer solution include N-methyl pyrrolidone, dimethyl acetamide, dioxane and mixtures thereof. The treated molecular sieve particles are added to the dilute solution while maintaining the solution in a state of agitation effective to disperse the particles uniformly throughout the solution. Then this suspension is subjected to sizing step conditions mentioned above. Thereafter, if desired, the treated particles can be filtered, washed and stored as before.

In another aspect, the sizing step can be bypassed. This is an option when the monofunctional organosilicon compound contains reactive linking groups and the continuous phase polymer contains active sites to react with the linking groups under normal membrane formation temperature conditions. The sizing step should not be performed when the compound does not contain reactive linking groups.

Formation of the mixed matrix membrane is completed typically by dissolving the polymer for the continuous phase in a suitable solvent and dispersing the silanated or silanated-and-sized molecular sieve particles in the resulting polymer solution. The particles can be added to the solution as a powder or as a suspension in a liquid medium. The order of combining ingredients is not critical. In yet another optional process variation, if the reactive linking groups have not yet been reacted with monomer or polymer, the sizing step can be carried out at this time by raising temperature and holding while maintaining the particles dispersed in the reaction medium, as above.

When a uniform dispersion of treated molecular sieves in polymer solution has been prepared, the membrane structure can be formed by conventional techniques. For example the suspension can be sprayed or cast with a doctor knife on a substrate or a substrate can be dipped into the suspension. The solvent is then removed by such typical techniques as ventilating the atmosphere above the forming membrane with a diluent gas, drawing a vacuum or immersing the forming membrane in a non-solvent for the polymer which is miscible with the solvent of the polymer solution. Optionally, the atmosphere, medium and/or the substrate can be heated to facilitate removal of the solvent. In the case of membranes formed on a substrate material, when the membrane is substantially free of solvent, it can be detached from the substrate to form a self-supporting structure or the membrane can be left in contact with a supportive substrate to form an integral composite assembly. In such a composite, preferably the substrate is porous or permeable to gaseous components which the membrane is intended to separate. Further optional fabrication steps include washing the membrane in a bath of an appropriate liquid to extract residual solvent and other foreign matter from the membrane, and drying the washed membrane to remove residual liquid.

EXAMPLES

This invention is now illustrated by examples of certain representative embodiments hereof, wherein all parts, proportions and percentages are by weight unless otherwise indicated. All units of weight and measure not originally obtained in SI units have been converted to SI units.

Example Materials

SSZ-13 A calcined aluminosilicate (Si/Al ratio of about 20–24) CHA type molecular sieve characterized by pores based on 8 member rings with about 3.8×3.8 Å (0.38×0.38 nm) dimensions which was prepared as disclosed in U.S. Pat. No. 4,544,538.

H-SSZ-13 Na$^+$ ion form of SSZ-13. The Na/Al ratio is about 1 measured by ESCA and/or ICP analyses.

Silicalite I Hydrophobic MFI type crystalline silica-based molecular sieve. MFI type molecular sieves are characterized by pores based on 10 member rings with about 5.1×5.6 Å (0.51×0.56 nm) dimensions.

APDMS 3-aminopropyldimethylethoxysilane

APDIPS 3-aminopropyldiisopropylethoxysilane

APS 3-aminopropyltriethoxysilane

APPMS 3-aminopropylmonomethyldiethoxysilane

ICDMS 3-isocyanatopropyldimethychlorosilane

DAPI 5,x-amino-(4-aminophenyl)-1,1,3 trimethyl indane

BTDA 3,3',4,4'-benzophenonetetracarboxylicdianhydride

HSMPD 1,3-diaminobenzene-4-sulfonic acid

Ultem® polyetherimide of 1,3-phenylenediamine ("MPD") and bisphenol A dianhydride ("BPADA") from General Electric Co.

Matrimid® polyimide of DAPI and BTDA from Vantico, Inc.

NMP N-methyl-2-pyrrolidone

PVAc polyvinyl acetate

EXAMPLE 1

Molecular sieve H-SSZ-13 (5 g) was dispersed in 100 g of a 2% solution of APDMS in 95/5 w/w ethanol/water using an ultrasonic horn. The dispersion was heated to 50° C. and held for 1.5 hours. The silanated molecular sieve was recovered by filtering through a 0.2 micron polytetrafluoroethylene filter. The filter cake was washed three times in ethanol and then dried overnight at 110° C. under vacuum. The cake was then soaked in ethanol for two weeks with solvent replacement every two days to remove as much free APDMS as possible. At conclusion of the two-week rinsing period the cake was dried under vacuum. ESCA analysis of the thoroughly washed cake showed an increase of carbon and nitrogen compared to the virgin molecular sieve powder. The increased carbon and nitrogen was consistent with presence of the aminopropyl moiety and thus demonstrated that APDMS had condensed onto the sieve particles. The cake can be easily reslurried for further processing. This example demonstrates silanation of a molecular sieve with monofunctional organosilicon compound.

EXAMPLE 2

2A: Sizing silanated molecular sieve to polymer in solution:

A polymer solution was prepared by dissolving 0.27 g Ultem® 1010 polyetherimide in 70 g NMP. To this solution 2 g of silanated molecular sieve of Example 1 was added and the slurry was well dispersed by ultrasonication. The dispersion was kept agitated at temperature in the range of 140–180° C. for 6 hours. After cooling the excess polymer was removed by filtering through a 0.2 μm polytetrafluoroethylene ("PTFE") filter and the resulting cake was washed three times with 75 g fresh NMP to complete the sizing process.

The cake was soaked in NMP with replacement of solvent every 2 days for 2 weeks and then vacuum dried. ESCA analysis showed that carbon and nitrogen had increased in comparison to the silanated molecular sieve. The nitrogen response was consistent with the presence of imide group and shows that the polyetherimide had become bound to the molecular sieve.

The wet cake can be re-slurried in an appropriate medium such as NMP. The slurry then can be blended into a high concentration polymer solution, e.g., 10–40% and molecular sieve:polymer weight ratio in suspension of 0.05–0.50. A mixed matrix membrane can be formed from the blend.

2B: Sizing silanated molecular sieve to monomer in solution:

APDMS was condensed onto H-SSZ-13 molecular sieve as in Example 1. This silanated molecular sieve was slurried as in Example 2A except that the solution contained the diamine DAPI and the dianhydride BTDA dissolved together in NMP. DAPI and BTDA are understood to be comonomers of commercially available polyimide such as Matrimid® polymer. The molecular sieve in contact with the diamine and dianhydride solution was heat-aged similarly to Example 2A. The molecular sieve cake after reaction was washed as above and subjected to ESCA. Analytical results showed that the carbon and nitrogen content of the sized molecular sieve had increased relative to the silanated molecular sieve. This confirmed that the monomer units and/or oligomers thereof had bonded to the silanated molecular sieve.

2C: Sizing silanated molecular sieve to polymer film:

Silanated molecular sieve was prepared as in Example 1 and dispersed in a solution of polymer as in Example 2. Before reacting the silanated molecular sieve and polymer however, the dispersion was cast as a dense film. The film was heated to 140–200° C. overnight to allow hydrophilic groups on the silanated portion of the molecular sieve to react with the polymer. The film of mixed matrix polymer bonded to the molecular sieve was re-dissolved in fresh solvent. The mixed matrix product was re-cast as a flat membrane.

This example shows various methods of sizing a molecular sieve that has been treated with a monofunctional organosilicon compound.

EXAMPLE 3

3A: Comparison example, preparation of a continuous phase polymer solution: A 20% PVAc solution was prepared by diluting a 25% solution of PVAc in toluene with ethanol.

3B: Comparison example, preparation of polymer solution containing dispersed untreated molecular sieve: Virgin H-SSZ-13 molecular sieve was dispersed in ethanol and the resulting suspension was added to a 25% solution of PVAc in toluene to form a suspension of 15 molecular sieve parts per hundred ("pph") polymer.

3C: Preparation of polymer solution containing dispersed silanated molecular sieve: H-SSZ-13 molecular sieve was silanated with APDMS as in Example 1. The APDMS-silanated H-SSZ-13 molecular sieve was dispersed in ethanol and the resulting suspension was added to a 25% solution of PVAc in toluene to form a suspension of 10 molecular sieve pph polymer.

Films were separately cast from each of solutions 3A–3C onto a flat PTFE coated surface with a 0.1 mm gap doctor knife. Residual solvent was evaporated in a vacuum oven at 100° C. Samples of each film were tested in a permeation cell with single gases at 35° C. and 275–410 kPa (40–60 psi) pressure differential. Film permeability was calculated by the formula $$P = J\delta/(A\,\Delta p)$$

in which

P is permeability in units of barrers ("B"), one barrer=$[10^{-10}\ cm^3\ (STP).cm/cm^2.sec.cm(Hg)]$, and J=rate of gas permeating the sample, $cm^3/sec$ at standard temperature and pressure conditions, measured by pressure increase in a constant evacuated volume.

δ=membrane thickness, cm, measured by optical microscopy of film cross section.

A=sample area exposed to gas migration, $cm^2$, and

Δp=pressure differential, cm (Hg).

Selectivities were calculated as the ratio of permeabilities of selected gas pairs. Results of these tests are shown in Table I.

Table I shows that untreated mixed matrix molecular sieve 3B increased nitrogen and oxygen permeability through the membrane compared to the polymer-only membrane 3A but that the oxygen/nitrogen selectivity did not improve. This may be due to gas bypassing through voids at the interface between the molecular sieve and polymer. In comparison to the polymer-only membrane 3A, Example 3C demonstrates that nitrogen and oxygen permeability and oxygen/nitrogen selectivity were all enhanced by silane treatment according to this invention. This enhancement is more noteworthy in that Example 3C utilized 33% less molecular sieve than 3B. Carbon dioxide/nitrogen and helium/nitrogen selectivity also were raised.

EXAMPLE 4

Comparison example of silanation of a molecular sieve with polyfunctional organosilicon compounds:

H-SSZ-13 molecular sieve was silanated as in Example 1 except that trifunctional silane APS (Ex. 4A) and that difunctional silane APMMS (Ex. 4B) were used instead of monofunctional APDMS. The silanated molecular sieve was formed into films of PVAc as in Example 3C at a concentration of 15 pph polymer. Permeation test results are shown in Table I. It is seen that the trifunctional organosilicon compound treatment had a negligible effect on the oxygen permeability and oxygen/nitrogen selectivity in comparison to the polymer only membrane of 3A. Although permeability increased in the samples of Ex. 4B relative to a polymer only membrane, selectivity did not rise. These examples demonstrate the importance of utilizing a monofunctional organosilicon compound.

EXAMPLE 5

Silanation of molecular sieve with monofunctional organosilicon compound with displaceable chlorine radical:

H-SSZ-13 molecular sieve was silanated with monofunctional chlorosilane ICDMS in anhydrous toluene. The solution was refluxed for 24 hours with agitation provided by a Teflon paddle at 150 revolutions per minute. The silanated molecular sieve was recovered by filtering through a 0.2 micron polytetrafluoroethylene filter. The filter cake was rinsed three times with toluene and then dried overnight at 110° C. under vacuum. A mixed matrix film of 15 parts of the ICDMS-treated molecular sieve per 100 parts PVAc was formed as in Example 3. This film was tested for membrane performance as above. Permeation performance results are also shown in Table I. The data demonstrate an improvement in both oxygen permeability and oxygen/nitrogen selectivity over polymer-only membrane (Ex. 3A). Oxygen permeability was equivalent to that of the untreated molecular sieve mixed matrix (Ex. 3B), however selectivity increased.

EXAMPLE 6

Silanation of silicate molecular sieve with monofunctional organosilicon compounds: In these examples a MFI type molecular sieve silicalite I was silanated with monofunctional organosilicon compounds APDIPS and with APDMS, as in Example 1. Mixed matrix films of 15 molecular sieve pph PVAc polymer were prepared as described in corresponding Examples 3B and 3C. Untreated silicalite, APDIPS-treated silicalite and APDMS-treated silicalite were used in Exs. 6A, 6B and 6C, respectively. The films were tested for permeation performance as above and results are reported in Table I.

Comparison of Ex. 6A to 3A shows that untreated silicalite did not improve the oxygen permeability or the carbon dioxide/nitrogen selectivity over that of the continuous phase polymer alone. Mixed matrix membranes of silicalite treated with either APDIPS or APDMS demonstrated significantly enhanced oxygen permeability and oxygen/nitrogen and carbon dioxide/nitrogen selectivities.

TABLE I

| Example | | Permeance (Barrers) | | Selectivity | | |
| --- | --- | --- | --- | --- | --- | --- |
| | | $N_2$ | $O_2$ | $O_2/N_2$ | $CO_2/N_2$ | $He/N_2$ |
| 3A | | 0.089 | 0.53 | 5.91 | 34.7 | 169 |
| 3B | | 0.142 | 0.81 | 5.74 | | |
| | | 0.130 | 0.77 | 5.97 | | |
| | average: | 0.136 | 0.80 | 5.8 | | |
| 3C | | 0.094 | 0.67 | 7.12 | | |
| | | 0.103 | 0.73 | 7.05 | | |
| | | | | 6.91 | 51.1 | 212 |
| | | | | 6.94 | 51.3 | 212 |
| | average | 0.099 | 0.70 | 7.01 | 51.2 | 212 |
| 4A | | | 0.55–0.60 | 5.55–5.96 | | |
| 4B | | 0.143 | 0.91 | 6.37 | | |
| | | 0.123 | 0.68 | 5.52 | | |
| | | 0.143 | 0.81 | 5.70 | | |
| | | 0.115 | 0.66 | 5.71 | | |
| | average | 0.75 | 0.76 | 5.82 | | |
| 5 | | | 0.5–0.8 | 6.1–6.4 | | |
| 6A | average | | 0.45 | 6.2 | 32.3 | |
| 6B | | | 0.55–0.90 | 6.2–7.0 | | |
| | average | | 0.70 | 6.6 | 36.9 | |
| 6C | | | 0.56–0.64 | 6.5–6.8 | 42–44 | |
| | average | | 0.61 | 6.7 | 43.1 | |

EXAMPLES 7–9

Sizing of monofunctional organosilicon compound treated molecular sieve with various polymers.

7A: A solution of 25% Ultem® 1000 polyetherimide in NMP was cast on a glass plate at about 65° C. with a 0.1 mm gap doctor knife. The film was removed from the plate after 4 hours and was dried under tension in a vacuum at 150° C. for 7 days.

7B: H-SSZ-13 molecular sieve was initially silanated with APDMS as in Example 1. The silanated molecular sieve was dispersed by ultrasonication in a 25% Ultem® 1000 polyetherimide solution at 15 parts sieve per 100 parts polymer. A film was cast from this slurry as in Ex. 7A except that the cast film was stored at 150° C. overnight. The film was then re-dissolved in an amount of fresh NMP effective to produce a molecular sieve suspension in 20% polymer solution. This solution was recast on a glass plate heated to 65° C. The recast film was removed from the plate after 4 hours and was dried under tension in vacuum at 150° C. for 7 days.

Films of 7A and 7B were tested for permeation properties as above and the results are shown in Table II. The treated molecular sieve mixed matrix membrane exhibited both increased oxygen permeability and oxygen/nitrogen selectivity relative to the polymer-only membrane.

8: Molecular sieve H-SSZ-13 was silanated with APDMS as in Example 1 and subsequently sized with Ultem® 1010 polyetherimide according to the procedure of Example 2A. This silanated and sized sieve was suspended in NMP by ultrasonication and the suspension was added to a 20% solution of Ultem® 1000 in proportion of 15 parts sieve per 100 parts polymer. The solution was cast onto a 65° C. glass plate using a 0.1 mm gap doctor knife. The film was removed from the plate after 4 hours and dried under tension in a vacuum oven at 150° C. for 7 days. This film was tested for permeation performance and the results are presented in Table II. The mixed matrix membrane provided both higher oxygen permeability and oxygen/nitrogen selectivity than the sieve-free membrane of Example 7A.

9: A solution of about 25% Ultem® 1000 polyetherimide in chloroform was spread in a casting ring on a glass plate at ambient temperature and maintained overnight at room temperature. The resulting film (Ex. 9A) was placed in a vacuum oven at 80° C. for 7 days.

Molecular sieve H-SSZ-13 was silanated with APDMS as in Example 1 and subsequently sized according to the procedure of Example 2A with a copolyimide of HSMPD and DAPI in ratio of 3:1 copolymerized with BPADA. A slurry was made by briefly dispersing with ultrasonication 1.09 g of the copolyimide-sized, silanated molecular sieve in 4.46 g of chloroform. The slurry was hand-mixed in 29.2 g of 25% solution of Ultem® 1000 polyetherimide in chloroform to provide approximately 21% polymer concentration in the mixture. The mixture was spread in a casting ring on a glass plate at ambient temperature and held overnight and the film thus produced (Ex. 9B) was placed in a vacuum oven at 80° C. for 7 days.

Films of Exs. 9A and 9B were tested for permeation performance as above. The results for the polymer-only film were substantially the same as for polyetherimide film cast from NMP reported for Example 7A. Results for Example 9B are shown in Table II. The mixed matrix membrane of polyetherimde continuous phase polymer and dispersed phase of silanated molecular sieve sized with copolyimide demonstrated both higher oxygen permeability and oxygen/nitrogen selectivity than the polyetherimide membrane.

Examples 7–9 thus illustrate various schemes for sizing a polymer to molecular sieve which has been treated with a monofunctional organosilicon compound. The polymer chosen for sizing can be either the continuous phase polymer (as in Exs. 7B and 8) or a different polymer which is compatible with the continuous phase polymer (as in Ex. 9B).

TABLE II

| Example | Permeance (Barrers) $O_2$ | Selectivity $O_2/N_2$ |
| --- | --- | --- |
| 7A | 0.40 | 7.8 |
| 7B | 0.40–0.53 | 10.4–10.6 |
| 8 | 0.57 | 10.0 |
| 9A | 0.40 | 7.8 |
| 9B | 0.91–0.95 | 10.4–10.8 |

Although specific forms of the invention have been selected for illustration in the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A process for separating component gases of a gas mixture comprising the steps of
   (A) providing a mixed matrix gas separation membrane comprising an active layer of a treated molecular sieve dispersed in a continuous phase of a matrix polymer in which the treated molecular sieve comprises the reaction product of a (i) molecular sieve through which at least one component gas in the mixture is preferentially gas permeable relative to another component gas, with (ii) a monofunctional organosilicon compound having the formula $Si(XYR_1R_2)$ in which X is a displaceable radical, Y is a linking group, and $R_1$ and $R_2$ are each independently any radical other than a displaceable radical,
   (B) contacting the gas mixture on one side of the membrane to cause the component gases to selectively permeate the membrane, and
   (C) removing from the opposite side of the membrane a permeate gas composition enriched in concentration of the at least one component gas.

2. The process of claim 1 in which the component gas to be separated from the gas mixture has a kinetic diameter of about 2.0–5.0 Å (0.2–0.5 nm).

3. The process of claim 2 in which the component gas is oxygen.

4. The process of claim 2 in which the component gas is carbon dioxide.

5. The process of claim 1 in which the monofunctional organosilicon compound is a silane selected from the group consisting of 3-aminopropyldimethylethoxy silane (APDMS), 3-isocyanatopropyl dimethylchlorosilane (ICDMS), 3-aminopropyl diisopropylethoxy silane (APDIPS) and a mixture thereof.

6. The process of claim 5 in which the molecular sieve is selected from the group consisting of aluminosilicate type SSZ-13, hydrogen-exhanged aluminosilicate type H-SSZ-13, sodium-exchanged aluminosilicate type Na-SSZ-13, silicoaluminophosphate type SAPO-34, silicoaluminophosphate type SAPO-44, aluminosilicate type ZK-5, aluminosilicate type Zeolite RHO, aluminosilicate type Phillipsite, silicalite and a mixture thereof.

7. A mixed matrix gas separation membrane comprising particles of a treated molecular sieve dispersed in a continuous phase consisting essentially of a matrix polymer, in which the treated molecular sieve comprises the reaction product of a molecular sieve and a monofunctional organosilicon compound having the formula $Si(XYR_1R_2)$ in which X is a displaceable radical, Y is a linking group, and $R_1$ and $R_2$ are each independently any radical other than a displaceable radical.

8. The mixed matrix membrane of claim 7 in which X is selected from the group consisting of a halogen atom, a hydroxyl group, an ester radical having 1–8 carbon atoms an alkoxy group having 1–8 carbon atoms, and a mixture thereof.

9. The mixed matrix membrane of claim 8 in which the monofunctional organosilicon compound is selected from the group consisting of 3-aminopropyldimethylethoxy silane (APDMS), 3-isocyanatopropyl dimethylchlorosilane (ICDMS), 3-aminopropyl diisopropylethoxy silane (APDIPS) and a mixture thereof.

10. The mixed matrix membrane of claim 7 in which Y is selected from the group consisting of amino radical, amido radical, epoxy radical, ureido radical, isocyanato radical and a mixture thereof.

11. The mixed matrix membrane of claim 7 in which the molecular sieve is selected from the group consisting of aluminosilicate molecular sieve, silicoaluminophosphate molecular sieve, silicalite molecular sieve, and a mixture thereof.

12. The mixed matrix membrane of claim 11 in which the molecular sieve is a chabazite type zeolite selected from the group consisting of aluminosilicate type SSZ-13, hydrogen-exhanged aluminosilicate type H-SSZ-13, sodium-exchanged aluminosilicate type Na-SSZ-13, silicoaluminophosphate type SAPO-34, silicoaluminophosphate type SAPO-44, and a mixture thereof.

13. The mixed matrix membrane of claim 12 in which the monofunctional organosilicon compound is 3-aminopropyldimethylethoxy silane (APDMS).

14. The mixed matrix membrane of claim 11 in which the molecular sieve is a zeolite selected from the group consisting of aluminosilicate type ZK-5, aluminosilicate type Zeolite RHO, aluminosilicate type Phillipsite, and a mixture thereof.

15. The mixed matrix membrane of claim 7 in which the matrix polymer is selected from the group consisting of polysiloxane, polycarbonate, silicone-containing polycarbonate, brominated polycarbonate, polysulfone, polyether sulfone, sulfonated polysulfone, sulfonated polyether sulfone, polyimide, polyether imide, polyketone, polyether ketone, polyamide, polyamide/imide, polyolefin, fluorine-containing polyolefin, polyacetylene, polytrimethysilylpropyne, polyperfluorodioxole and a mixture thereof.

16. The mixed matrix membrane of claim 7 in which at least one of $R_1$ and $R_2$ is a lining group.

17. A process for making a mixed matrix gas separation membrane having an active layer of particles of a treated molecular sieve dispersed in a continuous phase consisting essentially of a matrix polymer, comprising the steps of,
   (A) providing a monofunctional organosilicon compound having the formula $Si(XYR_1R_2)$ in which X is a displaceable radical, Y is a linking group, and $R_1$ and $R_2$ are each independently any radical other than a displaceable radical,
   (B) reacting a molecular sieve with the monofunctional organosilicon compound at a temperature and for a duration effective to bond the molecular sieve to the Si atom of the monofunctional organosilicon compound by displacing the radical X, thereby forming the treated molecular sieve,
   (C) blending the product of the preceding step with an amount of the matrix polymer effective to obtain a blend having a proportion of about 5–50 weight parts molecular sieve per 100 weight parts polymer, and
   (D) forming a membrane structure from the blend.

18. The process of claim 17 in which after the reacting step further comprises the step of sizing the treated molecular sieve with the polymer comprising reacting a linking group of the treated molecular sieve to the matrix polymer.

19. The process of claim 18 in which the sizing step occurs after the forming step.

20. The process of claim 17 in which after the reacting step further comprises the step of sizing the treated molecular sieve to the matrix polymer comprising reacting or associating a linking group with a second polymer to form an adduct capable of reacting or associating with the matrix polymer.

21. The process of claim 17 in which after the reacting step further comprises the step of sizing the treated molecular sieve to the matrix polymer comprising reacting or associating a linking group with a monomer of the matrix polymer to form an adduct capable of reacting or associating with the matrix polymer.

22. The process of claim 17 in which the monofunctional organosilicon compound is a silane selected from the group consisting of 3-aminopropyldimethylethoxy silane (APDMS), 3-isocyanatopropyl dimethylchlorosilane (ICDMS), 3-aminopropyl diisopropylethoxy silane (APDIPS) and a mixture thereof.

23. The process of claim 22 in which the molecular sieve is selected from the group consisting of aluminosilicate type SSZ-13, hydrogen-exhanged aluminosilicate type H-SSZ-13, sodium-exchanged aluminosilicate type Na-SSZ-13, silicoaluminophosphate type SAPO-34, silicoaluminophosphate type SAPO-44, silicalite molecular sieve, aluminosilicate molecular type ZK-5, aluminosilicate molecular sieve type Zeolite RHO, aluminosilicate molecular sieve type Phillipsite, and a mixture thereof.

* * * * *

UNITED STATES PATENT AND TRADEMARK OFFICE
CERTIFICATE OF CORRECTION

PATENT NO.     : 6,508,860 B1
DATED          : January 21, 2003
INVENTOR(S)    : Sudhir S. Kulkarni It is certified that error appears in the above-identified patent and that said Letters Patent is hereby corrected as shown below:

<u>Column 20,</u>
Line 30, please delete the word "lining" and replace it with the word -- linking. --

Signed and Sealed this

Twenty-second Day of April, 2003

JAMES E. ROGAN
*Director of the United States Patent and Trademark Office*